April 30, 1940. W. O. DUKE 2,199,358
SAFETY DEVICE FOR WRINGERS
Filed Sept. 8, 1936
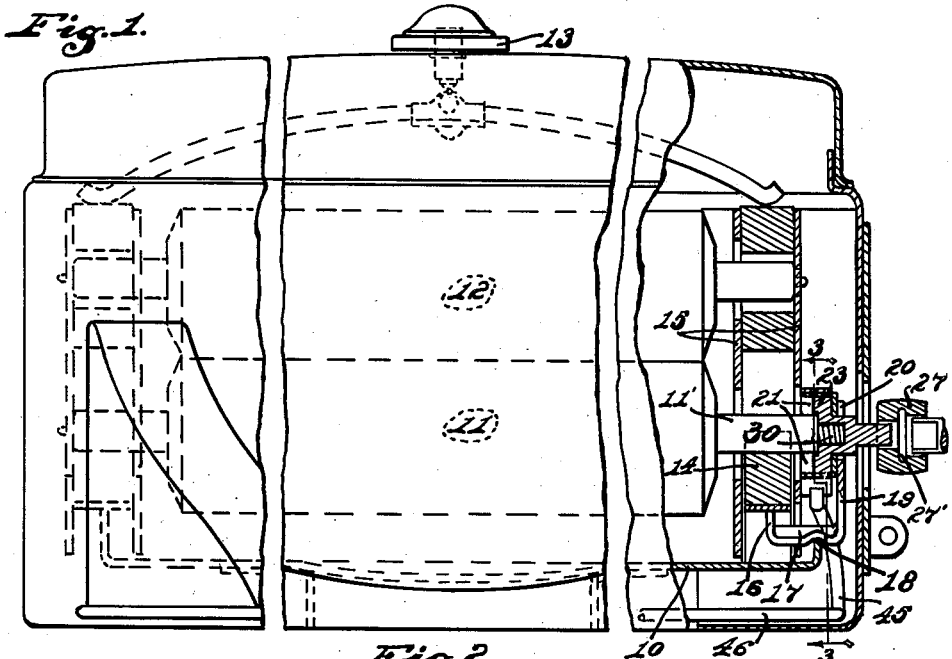
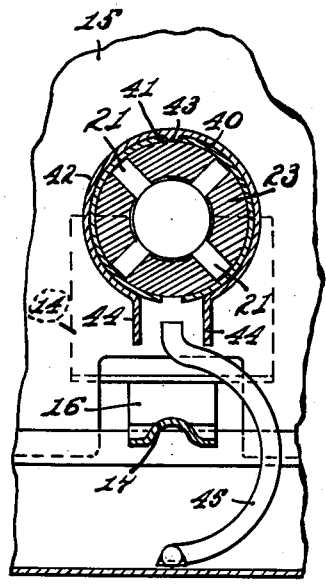
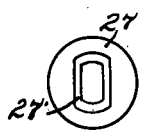
INVENTOR.
William O. Duke,
BY
Hood & Hahn.
ATTORNEYS.

Patented Apr. 30, 1940

2,199,358

UNITED STATES PATENT OFFICE 2,199,358

SAFETY DEVICE FOR WRINGERS

William O. Duke, Salem, Ohio, assignor to Mullins Manufacturing Corporation, Salem, Ohio, a corporation of New York Application September 8, 1936, Serial No. 99,720

8 Claims. (Cl. 68—249)

The object of my invention is to provide a wringer having a clutching mechanism, interposed between the power delivery shaft and the power driven roller of the wringer, of such character that clutching mechanism will be rendered active or inactive dependent upon pressure relationship between the two wringer rollers.

The accompanying drawing illustrates the embodiment of my invention:

Fig. 1 is a vertical section showing the parts in position to produce active relationship between the clutching mechanism and the driven roller;

Fig. 2 is a similar, but fragmentary, section showing the clutching mechanism in inactive relationship;

Fig. 3 is a section on line 3—3 of Fig. 1;

Fig. 4 is an elevation of one end of the coupler; and

Fig. 5 is an elevation of the other end of the coupler.

In the drawing 10 indicates the main frame of the wringer, in which are mounted the co-operating rollers 11 and 12, desirable pressure relationship between these two rollers being determined by any suitable mechanism 13, the details of which may be widely varied, which, in commercial practice, will embody some quick release mechanism by which the lateral pressure of roller 12 upon roller 11 may be quickly released.

One end of the shaft 11' of roller 11 is journalled in a vertically shiftable bearing block 14, mounted in suitable guideways 15 in the frame 10 and resting, in its lowermost position, upon the upwardly presented arm 16 of a lever 17 rockably supported at 18 upon the frame 10 and having an upwardly extending arm 19, conveniently parallel with arm 16, and bifurcated, at 20, at its upper end.

Shaft 11' is provided with diametrically opposed radial clutching lugs 21, 21, adapted to seat in the diametrically opposite radial pockets 22, 22 of a clutching element 23, the shank 24 of which is projected between the fingers of the bifurcation 20, and, at its outer end 25, is of polygonal cross-section to seat in a polygonal bore at the delivery end of a coupler 27. Coupler 27 at its opposite end has a polygonal bore 28 loosely receiving the polygonal end of power-delivery shaft 29. Excessive axial movement of coupler 27 toward the right (Figs. 1 and 2) is prevented by the internal shoulder 27'. The association of parts 23, 27 and 29 is loose enough to permit the necessary axial movement of the clutch element 23 without rotatively disconnecting these parts.

Interposed between shaft 11' and the clutching element 23 is the compression spring 30 and interposed between the bifurcated end of arm 19 and the radial shoulder 23' of the clutching element 23 is the wear-washer 31.

The rockable relationship between the main body 10 and bracket 17 is conveniently obtained by the transverse depression 32 formed in the cross arm of bracket 17 which depression receives and rides upon lip 18 of main frame 10. Spring 30 is of sufficient strength to axially shift the clutching element 23 when the roller pressure mechanism 13 is released or diminished to a non-working condition but is light enough to be compressible to a condition permitting interlocking relationship between lugs 21 and clutch element 23 when pressure mechanism 13 is manipulated to a position sufficient to establish working relationship between rollers 11 and 12.

The bore 23" of the clutching element 23 is slightly larger than the diameter of the received end of shaft 11' to permit the slight rocking movement of the clutch element indicated in Fig. 2.

Sprung upon the periphery of the clutching element 23 is a split ring clip 40 of suitable friction material provided with a perforation 41 and sprung over this friction ring is a metal spring clip 42 provided with an internally projecting boss 43 which fits within perforation 41 to retain the two parts 40 and 42 against relative rotation. The ends 44, 44 of clip 42 lie upon opposite sides of an arm 45 attached to a tilting drain board 46 pivotally mounted in any suitable manner in the main frame so that reversal of rotation of the clutching element 23 serves to reverse the drain board.

I claim as my invention:

1. In a wringer, the combination with a main frame, a roller carrying shaft journalled in said main frame, a power transmitting clutch element associated with the roller shaft by an axially-separable rotatively-interlocking connection, a second roller imposed upon the first roller, yielding loading means imposing load upon the first-mentioned roller through said second-mentioned roller, means dependent upon the condition of said load imposing means determining the position of the power transmitting clutch element, a drain board pivotally mounted in the main frame and provided with a manipulating arm, and an element frictionally carried by said clutching element and provided with portions engaging said manipulating arm in opposite directions.

2. In a wringer, the combination with a main frame, a roller carrying shaft journalled in said main frame, a power transmitting clutch element associated with the roller shaft by an axially-separable rotatively-interlocking connection, a drain board pivotally mounted in the main frame and provided with a manipulating arm, a spit ring friction element embracing said clutching element, a second split ring embracing the first-mentioned split ring and rotatively interlocked therewith, said second split ring having outwardly projecting ends straddling said manipulating arm.

3. A wringer comprising a main frame, a power actuated wringer roller, a co-acting wringer roller, control pressure means urging one roller upon the other, a bearing block for one end of the power roller shiftable vertically with the roller, a power-receiving clutching element associated with one end of the power roller and having an axially-separable rotatively-interlocking connection therewith, yielding means relatively biasing said clutching element to non-interlocking relation with the power roller, and means operatively associated with said bearing block and clutching element and partaking of vertical movement of said bearing block for alternately overcoming and yielding to said yielding means upon alternate opposite movements of said bearing block transversely of the axis of said power roller.

4. In a wringer, the combination with a main frame, a wringer roller having a shaft and bearing block for said shaft shiftable vertically with the shaft axis, of a power-transmitting clutch element associated with said roller shaft by a separable rotatively-interlocking connection, and a lever operatively associated with said clutching element and shaft and partaking of vertical movement of the vertically shiftable bearing block whereby transverse movements of the shaft will determine the interlocking relationship between the shaft and the clutch element.

5. In a wringer, the combination with a main frame, a wringer roller having a shaft and a bearing block for said shaft shiftable vertically with the shaft axis, of a power-transmitting clutch element normally aligned with said shaft and connected therewith by an axially-shiftable rotatively-interlocking connection, an axially-active spring interposed between said shaft and said clutching element and biasing said clutching element to non-interlocking relationship with the shaft, a lever rockably mounted in the main frame with one arm operatively associated with the bearing block and partaking of vertical movement thereof and the other arm operatively associated with the clutching element and partaking of axial movement thereof.

6. In a wringer, the combination with a main frame, a wringer roller having a shaft and a bearing block for said shaft shiftable vertically with the shaft axis, of a power-transmitting clutch element normally aligned with said shaft and connected therewith by an axially-separable rotatively-interlocking connection, an axially-active spring interposed between said shaft and said clutching element and biasing said clutching element to non-interlocking relationship with the shaft, a lever rockably mounted in the main frame with one arm operatively associated with the bearing block and partaking of vertical movement thereof and the other arm operatively associated with the clutching element and partaking of axial movement thereof, and bifurcated to straddle said clutching element.

7. In a wringer, the combination with a main frame, a roller journalled in said main frame and shiftable vertically in the main frame, a power-transmitting clutch element associated with the roller shaft by an axially-separable rotatively-interlocking connection, and a spring interposed between said clutching element and said shaft relatively biasing said elements to non-clutching relationship, and means arranged in the main frame in opposition to said spring and operatively associated with the shaft and partaking of the vertical movement of the roller shaft upon release of transverse load on said roller shaft and operatively associated with the clutching element and determining the axial relationship of the shaft and clutching elements.

8. In a wringer, the combination with a main frame, a roller journalled in said main frame and shiftable vertically in the main frame, a power-transmitting clutch element associated with the roller shaft by an axially-shiftable rotatively-interlocking connection, and a spring interposed between said clutching element and said shaft relatively biasing said elements to non-clutching relationship, a bearing block for the roller shaft movable vertically with the shaft, and a lever mounted in the main frame and operatively associated with the clutching element and the bearing block to partake of vertical movement thereof upon release of transverse load on said bearing block, said lever determining the axial relationship of the shaft and clutching element.

WILLIAM O. DUKE.